Figures 1, 11:
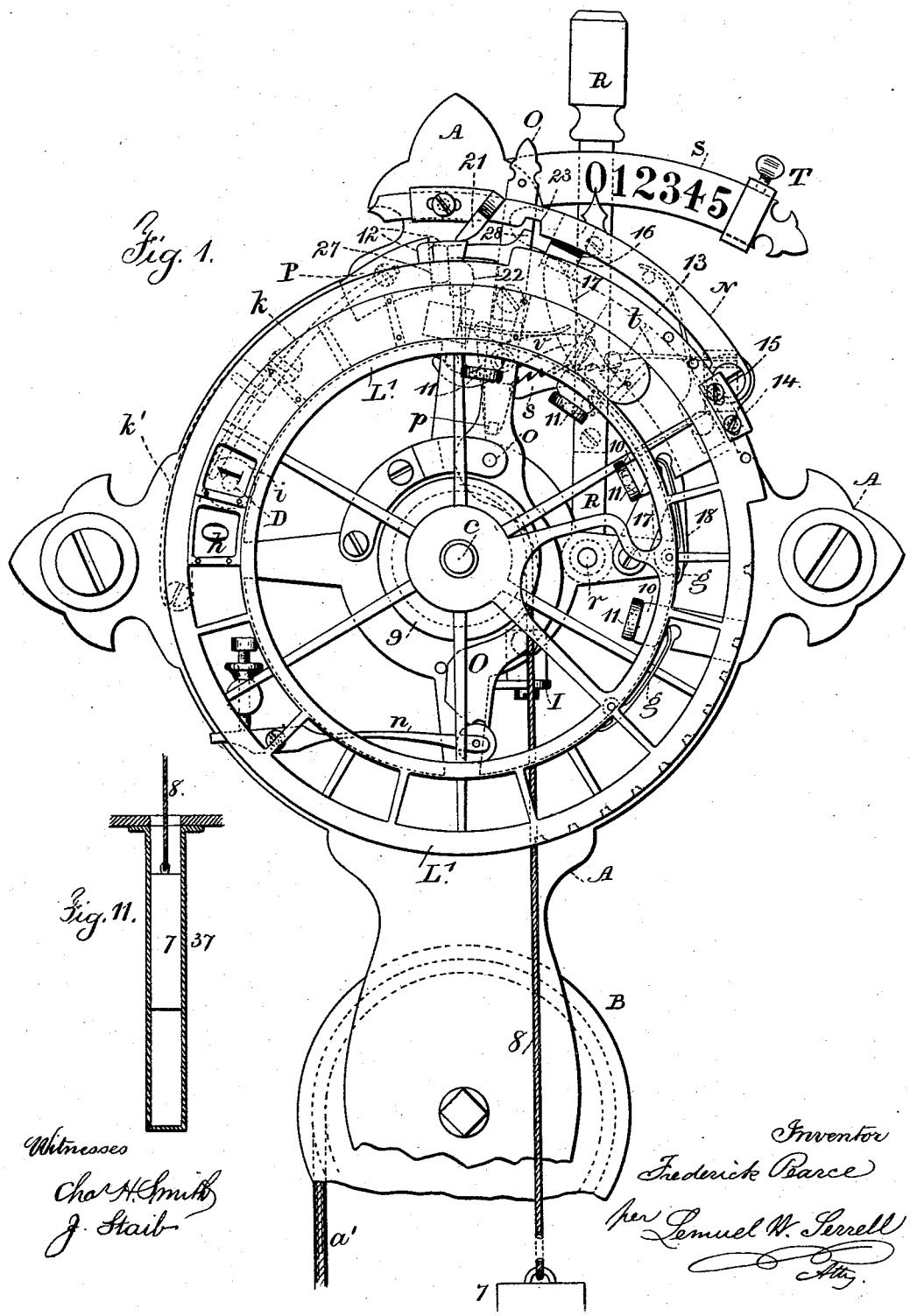

(No Model.) 6 Sheets—Sheet 1.

F. PEARCE.
DIAL TRANSMITTER.

No. 482,877. Patented Sept. 20, 1892.

Witnesses
Chas. H. Smith
J. Staib

Inventor
Frederick Pearce
per Lemuel W. Serrell
Atty.

(No Model.)  6 Sheets—Sheet 2.

F. PEARCE.
DIAL TRANSMITTER.

No. 482,877.  Patented Sept. 20, 1892.

Witnesses
Chas. H. Smith
J. Staib

Inventor
Frederick Pearce
per
Lemuel W. Serrell
Atty (No Model.)  6 Sheets—Sheet 3.
F. PEARCE.
DIAL TRANSMITTER.
No. 482,877.  Patented Sept. 20, 1892.
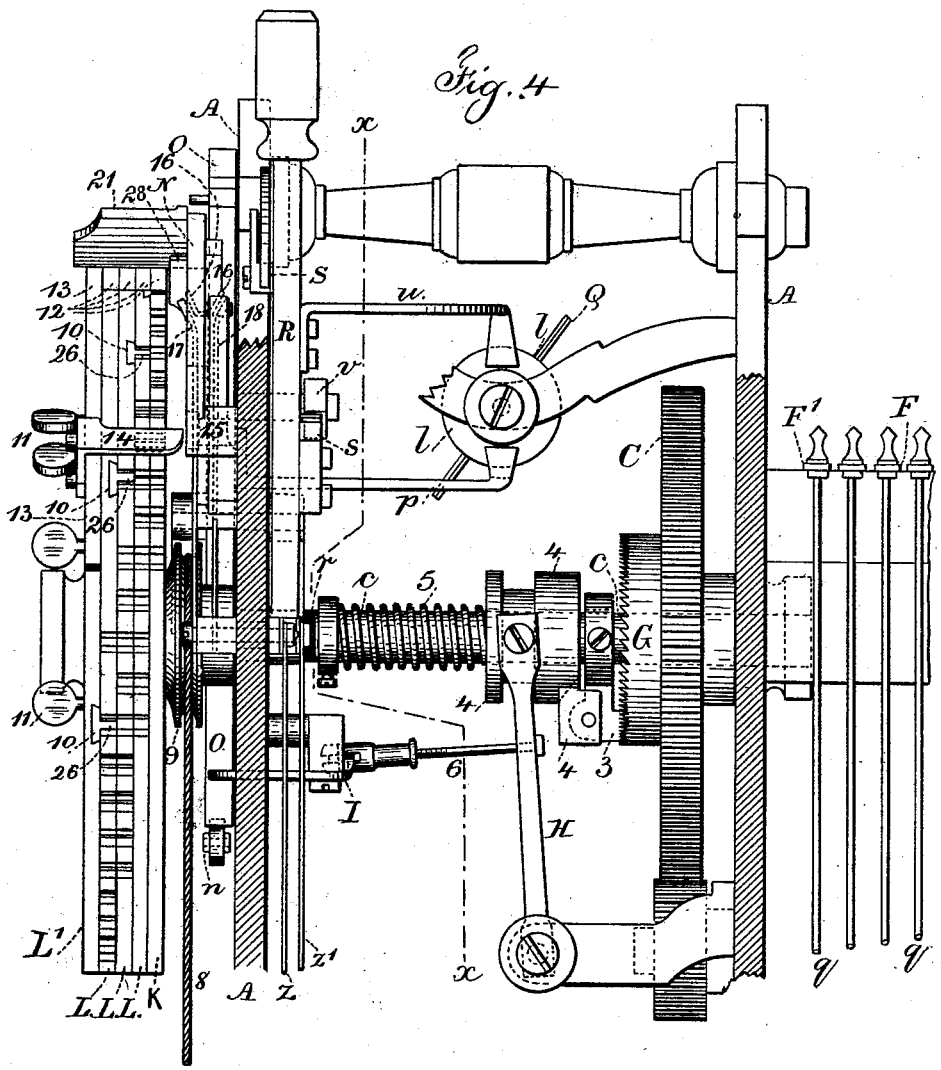
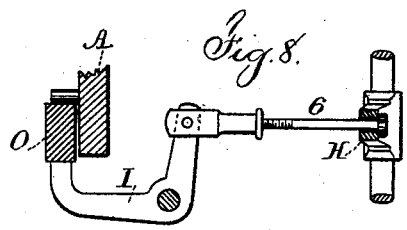
Witnesses
Chas. H. Smith
J. Staib
Inventor
Frederick Pearce
per Lemuel W. Serrell
Atty

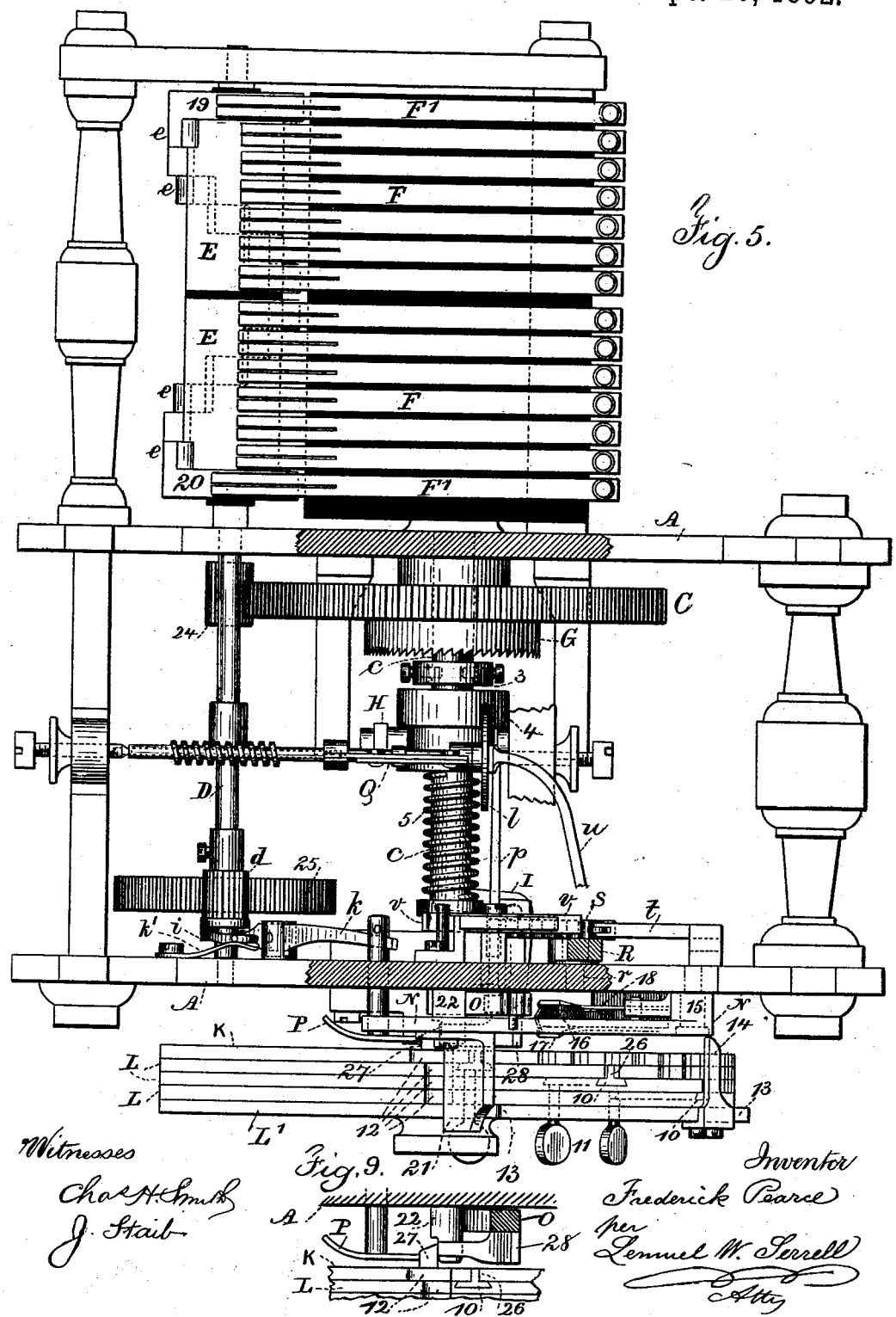

(No Model.) 6 Sheets—Sheet 5.
F. PEARCE.
DIAL TRANSMITTER.
No. 482,877. Patented Sept. 20, 1892.
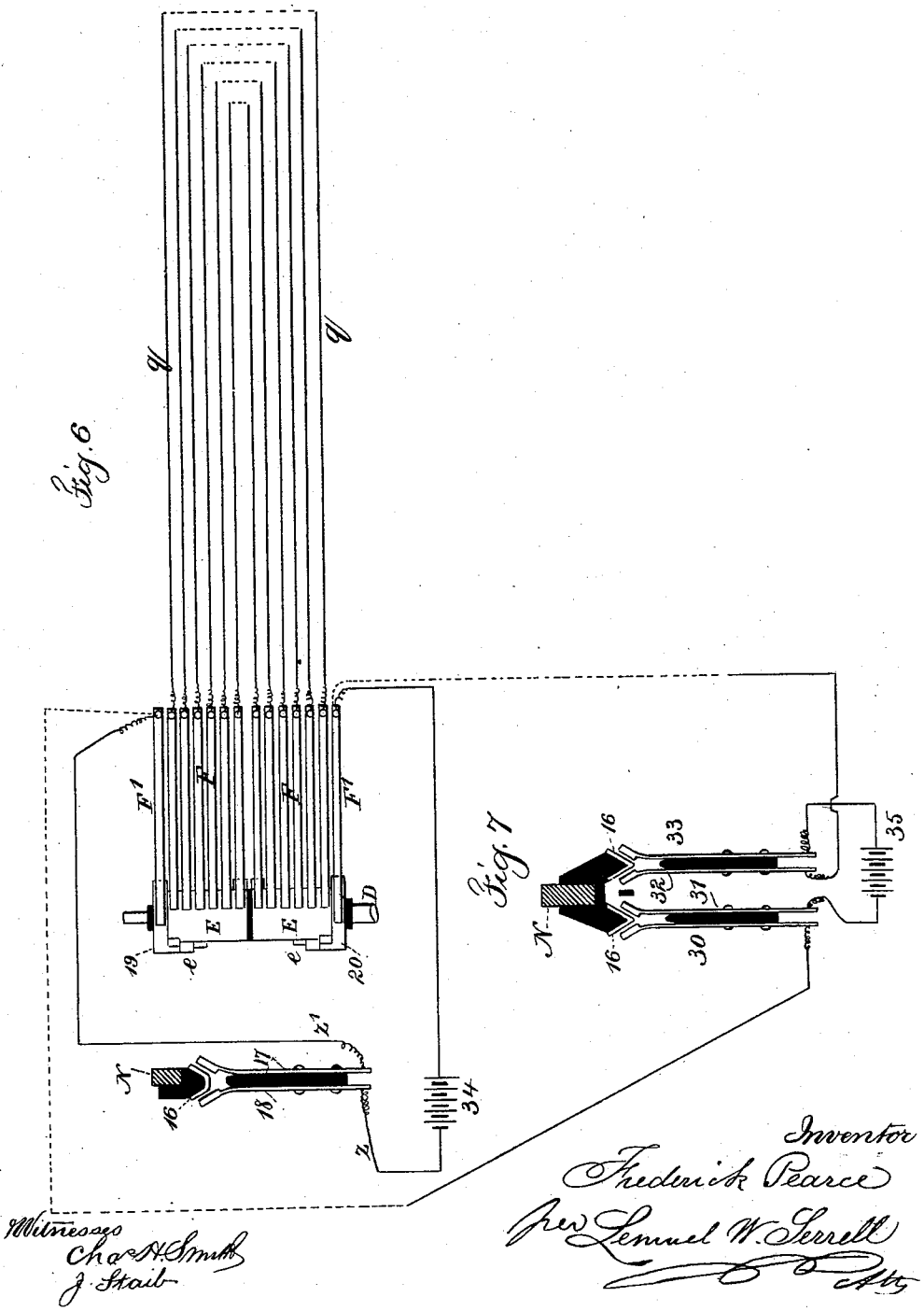

(No Model.)
F. PEARCE.
DIAL TRANSMITTER.
No. 482,877.
Patented Sept. 20, 1892.
6 Sheets—Sheet 6.
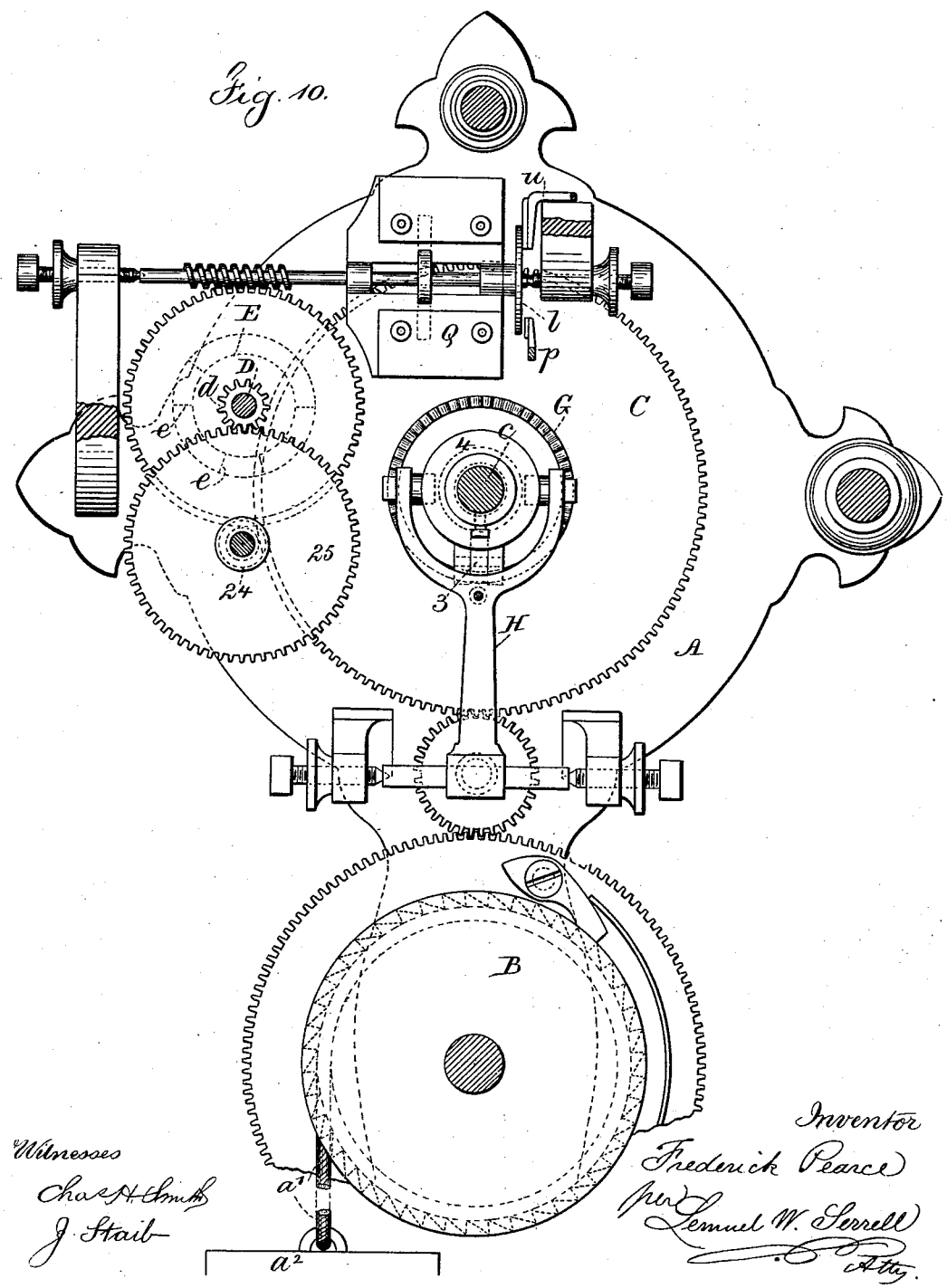

UNITED STATES PATENT OFFICE.

FREDERICK PEARCE, OF NEW YORK, N. Y.

DIAL TRANSMITTER.

SPECIFICATION forming part of Letters Patent No. 482,877, dated September 20, 1892.

Application filed May 3, 1892. Serial No. 431,628. (No model.)

*To all whom it may concern:*

Be it known that I, FREDERICK PEARCE, a citizen of the United States, residing in the city and State of New York, have invented an Improvement in Dial Transmitters, of which the following is a specification.

This instrument is especially available as a central-station instrument for fire-alarm telegraphs; and it is made with reference to giving facility to the operator for repeating the signal into a large number of circuits with a comparatively small battery-power and for making the instrument repeat the signals automatically the number of times for which the instrument may be adjusted.

In carrying out this invention a shaft is revolved and carries a circuit-closing cylinder, upon which are blocks arranged spirally, so as to come successively into contact with circuit-closing springs, whereby the signal or pulsation is sent out upon the different circuits is succession, and one stroke or signal is given in every circuit each revolution of the shaft and its cylinder. By this arrangement two, three, or more engine-houses can be on each circuit, and only a battery-power adapted to the resistance of one circuit is required, because the respective circuits are closed one after the other. In connection with this revolving circuit-closing cylinder an actuating mechanism or clockwork is employed, and a shaft that is connected to the clockwork by a clutch, and upon this shaft are two or more dials that are peculiarly constructed and they contain numbers or other indicating-signals, and the dials can be turned one upon the other so as to expose any desired numbers, and these act in connection with circuit-closing devices in such a way that a series of signals will be sent upon the respective circuits corresponding to the numbers indicated upon the dials, and when a complete set of signals has been sent out the clutch mechanism is disconnected and the dials are automatically returned to the place of beginning, and a second, third, fourth, or fifth set of signals can be sent out, being the repetition of the first set of signals, after which the mechanism is automatically stopped.

Figure 2:
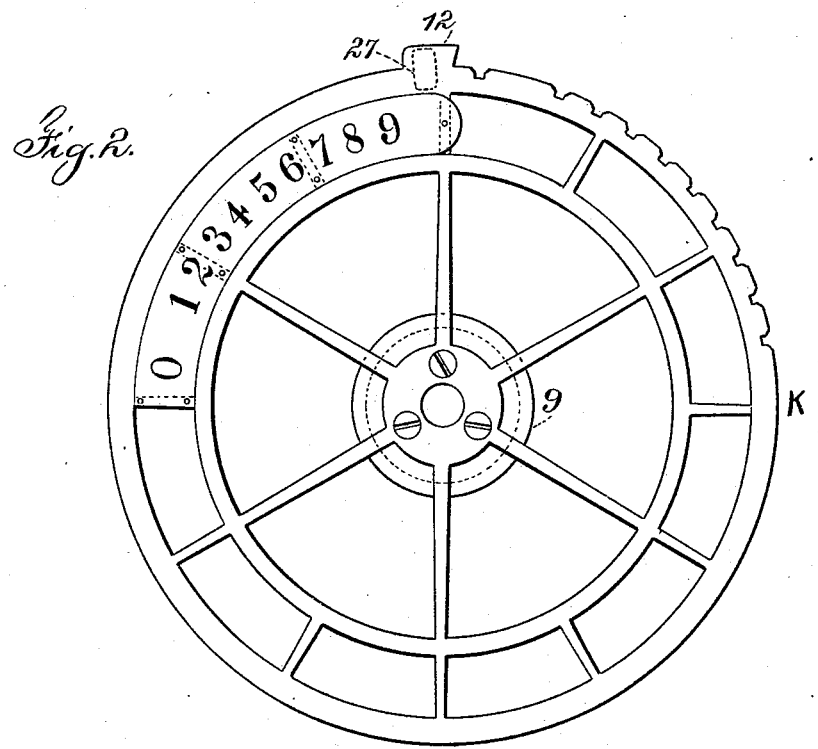
Figure 3:
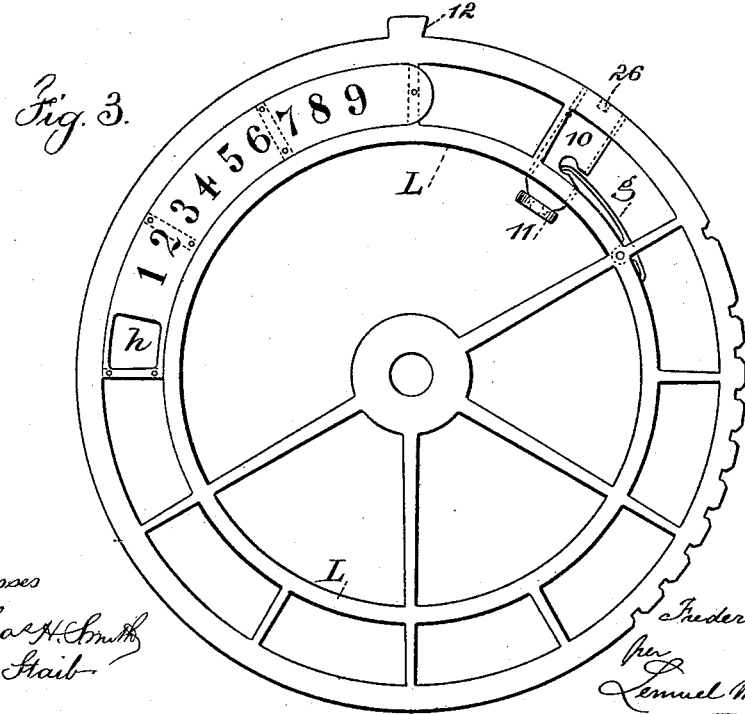

In the drawings, Figure 1 is a front elevation showing the dials complete. Fig. 2 is an elevation of the primary dial detached, and Fig. 3 is a similar view of one of the secondary dials. Fig. 4 is a partial elevation at one end of the machine, the frame being in section. Fig. 5 is a plan with the top of the framework removed. Figs. 6 and 7 are diagrams of the circuit connections. Fig. 8 is a detached plan view of the clutch connections. Fig. 9 is a detached view of the stops for the primary dial, and Fig. 10 is a vertical section at the line $x\ x$, Fig. 4. Fig. 11 is a section of the dash-pot on a smaller scale.

The frame A carries a barrel B, upon which a suitable cord or rope $a'$ is wound and to which an actuating-weight $a^2$ is applied, the same being wound up from time to time, as in an ordinary clock mechanism, and the intermediate gearing gives the desired speed to the gear-wheel C, which is loose upon the shaft $c$ and is connected by a clutch mechanism, hereinafter described, and this wheel C gears, through intermediate wheels 24 and 25, with the pinion $d$ upon the shaft D, that carries the circuit-closing cylinder E, and upon this circuit-closing cylinder E are contact-blocks $e$, arranged spirally and adapted in their number and positions to the circuit-closing springs F, which are in a range and have the wires $q$, leading to the respective circuits into which the signals are to be sent, and these contact blocks and springs are usually tipped with platina, and the blocks $e$, being arranged spirally, act in succession upon the springs F, so that the current is sent out upon one circuit and broken therefrom and instantly sent out upon the next circuit, and so on, and it is to be understood that the number of blocks in the range of circuit-closing blocks correspond to the circuits into which the current is to be sent, so that one complete revolution of the cylinder E sends one pulsation or signal into all the circuits with which the apparatus is connected, and it is to be borne in mind that pulsations sent into the circuits by one revolution of the cylinder E will be equidistant from the pulsations sent by the next revolution of the cylinder E, and if the cylinder E is allowed to revolve when the electric current is interrupted, a pause will be made between one set of signals and the next, so that, for instance, thirty-two would be indicated by three taps, a pause, and then two taps upon the electric gongs or other signals in the respective external circuits and then a longer pause is provided, as hereinafter described, while the dials return to the normal position and then the same taps are repeated.

The clutch which I prefer to employ is composed of a crown ratchet-wheel G upon the gear-wheel C, and the pawl 3 is forked at its inner end, and it is shown in Fig. 4 as pivoted upon the shaft $c$, and the end of the pawl is inclined, so as to engage the teeth on the crown ratchet-wheel G only in one direction, and the outer end of the pawl is pivoted to a sliding coupling 4, that is upon the shaft $c$, and a helical spring 5 around the shaft $c$ tends to press the pawl 4 into contact with the teeth of the crown-wheel, and there is a lever H, forked at the upper end, which forks pass into a groove in the sliding coupling 4 and this forked lever H is acted upon by a link 6 and bent lever I at the moment the dials complete their movement and commence to return to their normal position, as hereinafter described, so that the coupling is disconnected to allow the shaft $c$ and dials to rotate backwardly. This movement is effected by a weight 7, with a wire cord 8 passing around a grooved hub 9 of the primary dial K, the end of the wire cord 8 being affixed to the said grooved hub because the primary dial never makes a complete revolution. If the return movement of the dials by the action of the weight 7 is too rapid, it can be regulated by any ordinary or known device, such as a dash-pot.

The primary dial K is a fixture upon the shaft $c$, and it is preferably made as a skeleton wheel having numbers upon a segmental plate attached between the outer and intermediate rims of the skeleton wheel, as seen in Fig. 2, and the numbers upon the segment-plate of each dial are at such distances apart as to adapt the dials to the other portions of the apparatus.

The secondary dials L are loose upon the shaft $c$, and each of them is provided with a latch 10, with a finger 26 at the end adapted to engage notches or recesses in the dial next behind it, and the positions of these latches and of the notches in the primary and the respective secondary dials are such that when the secondary dial next to the primary dial is moved "1," "2," "3," "4," or any other number upon the primary dial can be uncovered, there being a quadrangular opening $h$ in each of the secondary dials, having a border around the opening, as seen in Figs. 1 and 3, and the opening is of such a size and in such a position that the number which is seen through the opening will indicate the number that is to be given by the dial upon which the observed figure is placed. Thus, for example, when the first of the secondary dials is moved so that the number "4" on the primary dial is observed through the opening $h$ in the secondary dial the primary dial will give four taps or signals upon the circuits by four revolutions of the circuit-closing cylinder E, as before described, and if the next of the secondary dials is set so that the figure "3" of the first of the secondary dials is observed through its opening $h$ the first of the secondary dials will give three signals or taps by three revolutions of the cylinder E before the stopping mechanism, hereinafter described, is brought into action; but between the four taps from the primary dial and the three taps from the first of the secondary dials the cylinder E will be allowed to revolve once with the electric circuit broken, so as to produce the pause between one set of signals and the other, and by using one primary dial and three secondary dials, signals can be given up to "9,999."

A convenient way of constructing the spring-latch 10 is to provide a plate sliding radially, or nearly so, in a dovetailed slot in the secondary dial, with a spring $g$ to press the latch inwardly, and a thumb-piece 11, by which the latch can be pressed outwardly to disconnect the finger 26 at the outer and back edge of the latch from the notch in the periphery of the dial next behind it.

On the periphery of each dial is a projection 12, which acts as a circuit-breaker, as hereinafter described; but the peripheral projection 13 upon the outer dial or margin-wheel L' is much longer, as shown in Figs. 1 and 5, in order that the circuit may be broken until the finger 14, which is fastened to this margin-wheel L' and projects backwardly, comes into action to disconnect the clutch before referred to and as hereinafter described.

I remark that the outer dial is not provided with numbers; but it is provided with a plate having an opening at the end of it, (see Fig. 1,) through which the numbers of the other dials can be observed, and the plate covers up the numbers of the other dials, except those that may be exposed successively, as before indicated. I also observe that the dials are made as skeleton wheels and that the outer dial is composed principally of two rims with two arms, Fig. 1, so as not to come into contact with the thumb-pieces 11 of either of the other dials. The first of the secondary dials can have the same number of arms as the primary dial; but the number of arms on the intermediate dials is more or less according to the extent of rotary movement that has to be allowed of one dial upon another.

The battery-closing arc N is pivoted at 15, and upon it is an insulated wedge 16, Figs. 1, 5, and 6, preferably of platina, adapted to pass between the circuit-closing springs 17 and 18, to which circuit-wires $z\ z'$ pass, and these wires and the springs 17 and 18 are insulated, and when the arc N is lowered the wedge 16 closes the circuit between 17 and 18 and allows the current to pass out on the line. When the arc N is raised, the wedge 16 is lifted sufficient to break the circuit, and I remark in this connection that at the ends of the circuit-closing cylinder E there are rings 19 and 20, to which the circuit-springs 17 and 18 are connected by the springs F', and that the two sections forming the cylinder are centrally insulated from each other and from the shaft. Hence the current will pass through these rings 19 and 20, through the insulated parts of the cylinder, and by the springs F as the contact-blocks e touch them in succession, sending the currents in the external circuits q successively; but when the circuit-closing arc N is lifted the cylinder E can revolve without any current being sent upon the external circuits, and upon this battery-closing arc N is a lifter 21, that extends across the upper edge of all the dials, and this lifter 21 and the projections 12 and 13 upon the dials are beveled or inclined, so that when either projection 12 or 13 comes into contact with the lifter 21 the circuit is broken between 16, 17, and 18, and the width of the projection 12 is to be such that it allows one rotation of the cylinder E, and as the projection 12 on one dial clears the lifter 21 the arc N falls and the circuit is closed again for the next set of taps or signals by the following dial, and so on, according to the number of dials that are in position for action. When nothing but the cipher or "0" upon the primary dial is visible, the projections 12 upon the respective dials are in line and also in line with the advancing end of the projection 13 on the margin-wheel L'. Hence if the instrument is started the arc N will remain lifted and no signal will be sent out, and according to the position of the respective dials and the number of dials that are brought into action the shaft c will be allowed to turn a greater or less number of degrees before the projection 13 upon the outer dial or margin-wheel L' comes into action; and it is to be borne in mind that the primary dial is always used to make the first signal, and preferably the next one, being the first of the secondary dials, is used to make the second signal, and so on, the outer or last of the dials, known as the "margin-wheel," L' simply serving as a cover to the numbers upon the other dials.

Upon the frame of the machine and behind the primary dial is the stop-lever O, pivoted at o, and at the lower end of the stop-lever is a spring n, with a roller at its end, that is pressed by said spring against the lower end of the stop-lever, and this lower end of the stop-lever is beveled at one side, so that when the stop-lever is moved in one direction the extreme lower end of the stop-lever rests upon the roller of the spring n, as in Fig. 1, there being a slight notch, so that the pressure of the spring holds the stop-lever O in position; but the moment its upper end is moved by the adjustable finger 14 on the outer dial or margin-wheel L' as it comes in contact with the upper end of such stop-lever O the spring n and roller, acting against the inclined portion of the lower end of the stop-lever O, moves the same suddenly, so that the stop-lever comes into contact with one end of the bent lever I, Figs. 4 and 8, before referred to, and draws back the sliding coupling 4 and disconnects the pawl 3 from the crown ratchet-wheel G, thereby liberating all the dials and allowing the weight 7 or its equivalent a spring by the wire cord 8 to turn all the dials and their shaft c backwardly to the place of beginning, and there is upon the back of the primary dial K a stop 27, adjacent to the projection 12, (see Fig. 9,) which stop 27, coming into contact with projection 28 from the upper portion of the lever O, gives a movement in the opposite direction to the said lever O against the action of the spring n and its roller, thereby preventing concussion of the parts and expending such concussion in giving motion to the stop-lever O back to the position shown in Fig. 1, and by this movement of the stop-lever O the bent lever I is relieved, and the spring 5 moves the sliding coupling 4 and engages the pawl 3 with the crown ratchet-wheel G, and a forward movement is instantly given again to the shaft and dials, and the signal is repeated, and this takes place the desired number of times before the machine is finally stopped, as hereinafter described. After the dials upon their return movement have given motion to the stop-lever O there might be a recoil. To prevent this, I provide a latch P between the frame and the primary dial K, which latch is moved by a spring $k'$ and, coming up in front of the stud 27 on the projection 12, holds the primary dial in position, and there is upon the shaft D an adjustable cam i, that acts upon a lever k to withdraw the spring-latch P, and this is done immediately that the rotation of the machine commences to turn the dials, and this adjustable cam i allows the spring-latch P to engage the projection 27 on the primary dial at the proper moment, having reference to the arrangement of the circuit-closing blocks upon the cylinder E, and the return of the dials and other parts to their normal positions.

There is provided in the clockwork, as usual, a fan to regulate the speed of movement, which fan is shown at Q, and adjacent to it is a disk l, which forms a stop, and upon the stop-lever O in an arm p, (see Figs. 4, 5, and 10,) projecting and having a pad at the end thereof, which arm and pad are brought into contact with the fan to stop the same, while the roller of the spring n is against the inclined end of the stop-lever O. Hence the fan and clock mechanism are stopped during the return movement of the dials; but as soon as the dials reach their normal position and act upon the stop-lever O, this arm p is moved away from the fan and the clock mechanism is allowed to revolve unless otherwise acted on.

In addition to the foregoing devices I provide a hand-lever R, pivoted at r, and carrying a toothed rack s, and there is a spring t with a roller bearing upon the teeth of the rack, (see Fig. 5 and dotted lines, Fig. 1,) so that this roller will be lifted as the lever R is moved by hand backwardly and the spring and roller will hold the hand-lever in any position to which it may be moved, and there is projecting from the hand-lever R a stop $u$, which comes into contact with the disk $l$ of the fan of the clock-movement to arrest the motion of the clockwork in the normal position of the apparatus, but when the hand-lever R is moved and the stop $u$ carried away from the fan the clock-motion is allowed to rotate.

The indicator S is provided adjacent to the hand-lever, and this indicator is stationary and has marked upon it numbers "1" "2" "3" "4," &c., and there is a spring-pawl $v$, projecting out from the stop-lever O and over the teeth of the rack $s$, and this pawl $v$ takes up one tooth of the rack $s$ each movement of the stop-lever O. Hence if the hand-lever R is set at 1 on the indicator S the pawl $v$ will act upon the toothed rack $s$ and bring the hand-lever R and its stop $u$ up to the normal position and stop the mechanism when the dials are first returned to their normal position, as before described; but if the hand-lever R is set to "2," "3, or "4" the pawl $v$ will take up one tooth upon the rack $s$ and the hand-lever R will not be brought up so as to stop the rotation of the mechanism until the stop-lever O has been acted upon by the return of the dials to the normal position as many times as it is desired to repeat the signal.

It will be understod that one signal can be given by the primary dial of any number from one up to nine; but the numbers may be extended as high as twenty or thirty, if desired.

When the first of the secondary dials is brought into position, a pause will occur in the signals between those given by the primary dial and the first of the secondary dials, and any number of signals from "1" up to "9" can be given by the secondary dial, and so on, if desired, by all of the secondary dials and the dials move all together and are returned automatically to their normal position after the signals have been given, and the act of returning the dials to their normal position causes the stop-lever O and its pawl $v$ to move the hand-lever R progressively to finally stop the mechanism, and this stopping action depends upon the position of the hand-lever R. As this lever R is moved progressively by the stop-lever O upon the return of the dials to their normal position, the signals given by the dials can be repeated two, three, or more times, according to the position to which the hand-lever is moved in starting the machine, thus giving great facility for repeating the signals over the respective circuits, as may be usual or become necessary.

I provide a movable stop T upon the indicator S, which stop may be set at any desired position, so that the operator in moving the hand-lever R will give the desired extent of motion to cause the signal to be given once or to be repeated two, three, or more times, as desired.

It will be observed that the return of the dials to their normal positions and the motion given to the stop-lever O in returning it to its normal position separates the pad and arm $u$, that projects from this stop-lever O from the fly-disk $l$, so that the mechanism commences to rotate, and this operation would be repeated every time the dials are returned to their normal position were it not for the fact that the movement of the stop-lever O gives to the hand-lever R a progressive motion by the pawl $v$ of the stop-lever acting upon the teeth of the rack $s$ one tooth each movement of the stop-lever O until the pad upon the arm $u$ of the hand-lever R stops the rotation of the fly.

It is advantageous to use the stud 22, Fig. 9, as a stop for the movement of the stop-lever O in one direction, and this stud 22 is adjacent to the stop 27 on the primary dial K, so that such stop 27 is held between the stud 22 and the latch P, Fig. 9, until the latter is withdrawn by the rotating of the cam $i$ as the mechanism is again allowed to revolve by the withdrawal of the pad from the fly.

I have represented in Fig. 6 a diagram by which it will be observed that the insulated wedge 16, upon the battery arc N, is between the circuit-springs 17 and 18, and one of these circuit-springs is connected to one pole of the battery 34 and the other circuit-spring is connected to the spring F', bearing upon the ring 19, and the current passes through the cylinder E and circuit-springs F upon the line or external circuits $q$, and in consequence of the cylinder E being made of two insulated parts an exterior metallic circuit can be employed, in which are included the electro-magnets in the respective engine-houses, and the return-circuit is through the ring 20 and the other spring F' to the other pole of the battery.

In Fig. 7 I have represented the insulated wedge 16 as made of two insulated parts and double insulated contact-springs 30 31 32 33, so that by the lifting of the wedges the circuit is entirely broken to the battery 35, thus preventing any local ground or waste of battery-power; and when the battery-closing arc N drops and the double insulated wedge 16 passes in between the circuit-springs it simultaneously puts on the battery and closes the connections in the machine itself, as indicated by the dotted lines passing to the circuits shown in Fig. 6.

According to the length of the projection 13, forming a portion of the periphery of the margin-wheel L', so there will be a greater or less period of time between one set of signals being sent out and the repeating of that set of signals, and this portion 13 of the margin-wheel holds up the circuit-closer N, so that the battery is cut out, and the projection 28, Fig. 1, upon the stop-lever O also holds up the battery-closing arc N, after the upper end of the lever O has been moved upon the completion of the forward movement of the dials, and as soon as the dials complete their return or backward movement and move the lever O in the opposite direction the projection 28 thereon passes beneath the notch 23 in the arc N, so that that arc may fall and close the circuit as soon as the projections 12 pass from beneath the finger 21 upon such arc N.

I claim as my invention—

1. The combination, in a dial transmitter, of a primary dial containing indicating-numbers, a shaft carrying the same, gearing and a weight to rotate the same in one direction, a clutch mechanism to connect and disconnect the dial, a revolving circuit-closing cylinder, a stop-lever and mechanism connecting the same with the clutch, and a projection upon the dial to move the stop-lever in one direction and disconnect the clutch and allow the dial to be returned to its normal position, and a projection upon the dial to move the stop-lever in the opposite direction to couple the same to the clock mechanism for the repetition of the signal, and a weight or spring to return the dial to its normal position, substantially as set forth.

2. A series of dials for a dial transmitter, each dial having indicating-numbers on a portion of its face and the front dial having openings through which to observe the numbers upon the dials in the rear, latches by which the dials can be held in their proper relative positions, mechanism for rotating the dials in one direction and a circuit-closing device simultaneously rotated, a weight for returning the dials to their normal positions, a stop-lever and a finger upon the outer dial for moving the stop-lever in one direction, a clutch mechanism operated by the stop-lever to disconnect the dials from the rotating mechanism, and an arm or damper moved by the stop-lever to stop the fly of the motor, and a projection upon the dial to return the stop-lever to its normal position and allow the motor to rotate at the termination of the back movement of the dials, and a circuit-closing mechanism for breaking the electric circuit during the return movement of the dials, substantially as set forth.

3. The combination, with the rotating mechanism in a dial transmitter, of a series of dials, latches for holding the dials in their proper relative positions as they may be set for giving the desired signals, a revolving cylinder for closing the electric circuits, a battery-closing device, and projections upon the respective dials for acting upon the battery-closing device to break the electric circuit during one rotation of the circuit-closing cylinder between the signals given for one dial and those for the next dial, substantially as set forth.

4. The primary dial and a shaft with which it is connected, a grooved hub for the primary dial, a weight and cord connected with the grooved hub for returning the primary dial to its normal position, a motor for revolving the dial-shaft, and a clutch mechanism for connecting the shaft to the motor, a circuit-closing cylinder and its springs, one or more secondary dials loose on the shaft of the primary dial, and latches for holding the secondary dials in their proper relative positions, a circuit-closing arc and projections upon the dials to actuate the same, and circuit-connections, substantially as specified, whereby the connections to the battery are broken between the transmission of the signals for one dial and the signals for the next dial, substantially as set forth.

5. The combination, with the electric circuits and circuit-closing devices in a dial transmitter, of a primary dial, the shaft with which it is connected, a weight and cord for returning the dials to their normal positions, a clutch for connecting the dials with the motor, a stop-lever, and a finger upon the outer dial or margin-wheel for acting upon the stop-lever in one direction, a projection upon the primary dial for acting upon the stop-lever in the other direction, a latch for holding the primary dial at the end of its return movement, and mechanism actuated by the motor for withdrawing the latch when the instrument is set in motion, substantially as set forth.

6. The combination, in a dial transmitter, of dials, mechanism for adjusting and holding the dials in their proper relation one to the other, a motor for giving motion to the dials in one direction, a weight and cord for returning the dials to their normal positions, a clutch for connecting the dial-shaft to the motor, a stop-lever acted upon by the dials, first in one direction to disconnect the clutch mechanism and in the other direction to connect such clutch mechanism, a hand-lever, a rack upon the same, and a pawl upon the stop-lever for returning the hand-lever to its normal position, projections upon the hand-lever and stop-lever, respectively, for acting upon the fly of the motor for stopping and starting the apparatus, substantially as set forth.

7. The combination, with the dials in a dial transmitter and mechanism for moving such dials and returning them automatically to their normal positions, of circuit-closing devices actuated by the motor and a battery-closer acted upon by the dials, substantially as set forth, whereby the circuit is closed by the starting of the dials, interrupted between the signals for one dial and the signals for the next dial interrupted during the return of the dials to their normal positions, and again automatically closed as the dials are set in motion, substantially as set forth.

8. The combination, with the primary dial and the shaft with which it is permanently connected, of a motor-and-clutch mechanism for moving such dial, a cord and weight for returning the dial to its normal position, one or more secondary dials and latches for holding the dials in their respective positions when adjusted, an outer dial or margin-wheel, a stop-lever and a finger upon the margin-wheel for moving the stop-lever in one direction, and a projection on the primary dial for moving the stop-lever in the other direction, a battery-closing arc, an insulated wedge and circuit-closing springs, and a projection upon the arc extending out over the dials, there being projections upon the dials and upon the margin-wheel for raising the battery-closing arc and breaking the circuit to give the margin or pause between one signal and the next, or between one set of signals and their repetition, there being a projection upon the stop-lever for holding up the circuit-closing arc during the return movement of the dials, substantially as set forth.

9. The combination, in an electric signaling-machine, of dials, means for rotating the same, rotary circuit-closing devices and circuit connections, a circuit-closer having two contacts and receiving its motion from the dials, and double connections for simultaneously connecting the battery and external circuits or the reverse, substantially as set forth.

10. The combination, with the primary and secondary dials and the mechanism for rotating the same and the disconnecting coupling, of a weight to return the dials to their normal positions, and a dash-pot to regulate the speed of movement, substantially as set forth.

Signed by me this 23d day of April, 1892.

FREDERICK PEARCE.

Witnesses:
GEO. T. PINCKNEY,
WILLIAM G. MOTT.